United States Patent [19]

Antonelli et al.

[11] 4,238,387

[45] Dec. 9, 1980

[54] RHEOLOGY CONTROL ADDITIVE FOR PAINTS

[75] Inventors: Joseph A. Antonelli, Riverton, N.J.; Souheng Wu, Wilmington, Del.

[73] Assignee: E. I. Du Pont de Nemours and Company, Wilmington, Del.

[21] Appl. No.: 962,178

[22] Filed: Nov. 20, 1978

[51] Int. Cl.³ .................................................. C08K 3/20
[52] U.S. Cl. ................................ 260/42.29; 252/316; 260/31.2 XA; 260/32.8 R; 260/33.4 R; 260/42.52
[58] Field of Search ..................... 252/316; 260/42.29, 260/42.52, 33.4 R, 31.2 XA, 32.8 R

[56] References Cited

U.S. PATENT DOCUMENTS

| | | | |
|---|---|---|---|
| 3,013,897 | 12/1961 | Cupery et al. | 428/149 |
| 3,069,375 | 12/1962 | Bullitt et al. | 260/29.3 |
| 3,708,428 | 1/1973 | McDonald | 252/316 |
| 4,007,128 | 2/1977 | Poklacki | 252/316 |
| 4,066,820 | 1/1978 | Kelley | 428/483 |

*Primary Examiner*—Melvyn I. Marquis

[57] ABSTRACT

An Additive for solvent or water based coating compositions which controls the sag of finishes of such compositions; wherein the additive comprises
 (a) a finely divided silica,
 (b) a polyfunctional acid or an acid anhydride and
 (c) an amine.

High polymer solids water or solvent based coating compositions containing such an additive are useful for coating metal substrates such as those used in appliances, automobiles and trucks.

14 Claims, No Drawings

RHEOLOGY CONTROL ADDITIVE FOR PAINTS

BACKGROUND OF THE INVENTION

This invention is related to additives for coating compositions and in particular to an additive to control the rheology of coating compositions during and after application of the composition to a substrate.

To reduce air pollution, coating manufacturers are using high solids solvent based and water based coating composition. High solids coating compositions contain at least 50% by weight of film forming constituents. However, finishes of these compositions often sag after application and during baking and give a finish having thin spots and an unacceptable appearance. To reduce this sagging, the viscosity of the composition may be increased but this increased viscosity greatly reduces the solids content of the composition which defeats the purpose of a high solids coating composition. An additive is required that will change the rheology of a coating composition so that the composition will be thin at high shear rates (under spraying conditions) but will thicken at low shear rates (after application to a substrate) and will remain thickened during baking of the composition through a wide range of temperatures. The aforementioned description is a phenomenon known as pseudoplastic rheology.

The novel additive of this invention as described hereinafter provides such pseudoplastic rheology to high solids water and solvent based coating compositions.

SUMMARY OF THE INVENTION

An additive for coating compositions which comprises about:

(a) 40-98% by weight, based on the weight of the additive, of finely divided silica;

(b) 1-40% by weight, based on the weight of the additive, of a polyfunctional acid or an acid anhydride, and (c) 1-15% by weight, based on the weight of the additive, of an amine.

wherein the total of (a), (b) and (c) equal 100%.

High solids solvent or water based coating compositions containing such an additive are also part of this invention.

DETAILED DESCRIPTION OF THE INVENTION

The additive of this invention provides pseudoplastic rheology to high solids water or solvent based coating compositions. Generally about 1-15% by weight, based on the weight of the coating composition, of the additive is used. This provides the composition with pseudoplastic rheology that allows the composition to be sprayed at a high solids content on to a substrate using conventional equipment and that forms a smooth, even and continuous finish on the substrate. On baking at elevated temperatures or curing at ambient temperatures the finish does not run or sag but forms a smooth, even finish.

The additive comprises finely divided silica, a polyfunctional carboxylic acid or anhydride and an amine. As shown in Example 1 following this description of the invention, silica alone or combinations of silica plus amine or silica plus an acid do not provide the pseudoplastic rheology to a high solids coating composition. However, surprisingly and unexpectedly, when silica, acid and amine are combined, the resulting additive provides a high solids coating composition with excellent pseudoplastic rheology and the composition can be sprayed at high solids and baked to form a finish that does not sag or run and has an acceptable appearance.

The additive contains about 40-98% by weight, based on the weight of the additive, of finely divided silica. Preferably, for most uses the additive contains about 50-90% by weight of finely divided silica.

Preferably, fumed silica is used that has a particle size of about 0.002 to 1.0 micrometers and a surface area of about 2.5 to 1,200 square meters per gram. This silica usually is about 99.8% silicon dioxide by weight (on a moisture free basis) and exist in three dimensional branched chain aggregates and has a surface that is hydrophilic and capable of hydrogen bonding.

One particularly preferred fumed silica is "Cab-O-Sil" M-5 (available from the Cabot Corporation) having a nominal particle size, assuming spherical particles of about 0.007-0.014 micrometers and a surface area of about 200-400 square meters per gram.

The additive contains about 1-40% by weight, based on the weight of the additive, of a polyfunctional acid or acid anhydride. Preferably, about 5-35% by weight of polyfunctional acid or anhydride is used.

Typical acid and anhydrides that can be used are citric acid, maleic acid, maleic anhydride, phosphoric acid, polysulfonic acids, such as dinonyl naphthelene disulfonic acid, succinic acid, succinic anhydride, fumaric acid, itaconic acid, trimellitic acid or anhydride, partial esters of polycarboxylic acids such as a monoester of trimellitic acid.

The additive contains about 1-15% by weight, based on the weight of the additive, of an amine, preferably about 5-15% by weight, based on the weight of the additive of an amine is used. Typical amines are diethanolamine, triethanolamine, dimethyl ethanolamine, diethyl ethanolamine, ethylene diamine, diethylene triamine, triethylene tetraamine, polyethyleneimine, polypropylene imine, dimethyl aminoethanol, diethyl amino ethanol and the like. Preferably the amine should contain at least one amino group (primary, secondary or tertiary) and one hydroxyl group such as diethyl amino ethanol.

The additive may contain equal molar amounts of acid and amine or may contain excess acid or excess amine. The acidity or basisity of the additive can be adjusted for different compositions wherein it is being used.

An alkylene oxide such as propylene oxide or ethylene oxide can be used in the additive to partially replace the amine and under some conditions can be used to replace all of the amine. Generally, when the alkylene oxide is used, it is reacted with excess acid or amine to reduce the electrical conductivity of the additive. High electrical conductivity is detrimental to electrostatic spray application of coating compositions. Other epoxy containing compounds can be used in place of or in combination with the alkylene oxide such as low molecular weight epoxy resins, diepoxy compounds, styrene oxide, glycidyl methacrylate and the like.

The additive is prepared by dispersing the silica in a liquid medium and then the polyfunctional acid or anhydride is added and then the amine is added. Optionally, the acid or anhydride can be reacted with the amine and then added to the above prepared silica dispersion. Also, it is possible to add the amine before the acid or anhydride is added.

Generally, the composition contains about 2 to 60% by weight of a liquid which may be a solvent or water depending on the type of coating composition with which the additive is to be used. Alternatively, the additive may be prepared using a dispersing resin solution or dispersion, or a polymer solution or dispersion that is used in the coating composition. Another technique is to form a silica dispersion and blend the silica dispersion with the amine and acid or anhydride with the other constituents of a coating composition as is shown in Example 2 following hereinafter.

The following are examples of particularly useful additives:

fumed silica/citric acid/diethanolamine fumed silica/dinonyl naphthalene disulfonic acid/dimethylethanolamine fumed silica/phosphoric acid/diethanolamine fumed silica/maleic anhydride/diethanolamine fumed silica/maleic anhydride/diethanolamine/propylene oxide fumed silica/succinic anhydride/diethanolamine Particularly preferred additives are fumed silica/dinonyl naphthalene di-sulfonic acid/dimethylethanolamine and fumed silica/phosphoric acid/diethanolamine since they provide coating compositions with excellent pseudoplastic rheology.

Typical high solids aqueous based and solvent based coating composition that these additives can be used with are acrylics, alkyds, polyesters, polyurethanes, epoxies, epoxy esters, epoxy alkyds, acrylic polyurethanes, polyester polyurethanes and the like.

One particularly useful high solids compositions contains a blend of polyesters of about (a) 10–90% by weight, based on the weight of the blend, of a polyester (A) of trimethyl pentanediol and phthalic acid and (b) 90–10% by weight, based on the weight of a blend of a polyester B of trimethyl pentane diole an a mixture of dimethyl aliphatic carboxylates.

A crosslinking agent such as alkylated melamine formaldehyde resin can be added to the above composition.

Another useful high solids coating composition contains an acrylic polymer of methyl methacrylate, an alkyl acrylate having 2–12 carbon atoms in the alkyl group and a hydroxy alkyl acrylate or methacrylate having a weight average molecular weight of about 500–5000. Generally, these polymers are prepared by free radical polymerization in a ketone solvent such as methyl ethyl ketone and using a chain terminator such as 2-mercaptoethanol. One typically useful composition has a polymer solids content of about 75–85% by weight and the acrylic polymer is the polymerization product of methyl methacrylate/butyl acrylate/hydroxy ethyl acrylate in a 30/38/32 weight ratio. These compositions generally contain a crosslinking agent such as an alkylated melamine formaldehyde resin.

The high solid coating compositions containing the additive of this invention can be applied by conventional equipment and means. Usually the compositions are applied by spray application and baked 125°–150° C. for about 15 minutes to 2 hours to provide high quality finishes that are sag free and have an excellent appearance The following examples illustrate the invention. All parts and percentages are on a weight basis. Molecular weights are determined by gel permeation chromatography.

EXAMPLE 1

A polyester A solution of 2,2,4-trimethyl pentane-1.3-diol (TMPD) and isophthalic acid is prepared as follows:

Into a five liter three-necked flask equipped with stirrer, thermometer, a packed column, condenser, and a Dean-Stark trap are placed TMPD, 1839.6 g; isophthalic acid, 996.0 g; toluene, 54.0 g; and dibutyltin dilaurate, 3.0 g. The contents of the flask are heated to a maximum temperature of 208° C. for a total of eleven hours during which time a water-toluene azeotrope is collected to remove the theoretical amount of water. The resulting product is reduced with a solvent mixture of toluene/aliphatic solvent 20:30 ratio to a 90% solids content. This product has an acid number of 5.4, a Gardner Holdt viscosity measured at 25° C. of about $Z^3$ and a Brookfield Viscosity measured at 25° C. of 5000–7000.

A polyester B of 2,2,4-trimethyl pentane 1,3-diol (TMPD) and a mixture of dimethyl aliphatic carboxylates is prepared as follows:

Into an apparatus described in above are charged TMPD, 1839.6 g; a mixture of dimethyl succinate, dimethyl glutarate, and dimethyl adipate, in a weight ratio of 1:2:1, 972.0 g and dibutyltin dilaurate, 3 g. The contents of the vessel are heated to a maximum of 202° C. for a total of nine hours during which time the theoretical amount of methanol is collected. The resulting product has a Gardner-Holdt viscosity of Q and a hydroxyl number of 213.

A silica dispersion is prepared as follows:

| | grams |
|---|---|
| "Cab-O-Sil" M-5 silica (fume silica having a weight average particle size of about 0.012 micrometers and a surface area of about 200 m²/g.) | 15.0 |
| Polyester B (prepared above) | 44.6 |
| Polyester A solution (prepared above) | 82.9 |
| Amyl acetate | 7.5 |
| | 150.0 |

The above constituents are mixed together and then dispersed in a high speed mixer to form a silica dispersion.

Coating composition I is prepared by blending together the following constituents:

| | grams |
|---|---|
| Polyester solution A (prepared above) | 17.99 |
| Silica Dispersion (prepared above) | 15.00 |
| Hexamethoxymethyl melamine | 30.00 |
| Total | 62.99 |

Coating composition II is prepared by blending together the following constituents:

|  | grams |
| --- | --- |
| Coating composition I | 126.0 |
| Diethanolamine | 1.5 |
| Total | 127.5 |

Coating composition III is prepared by blending together the following constituents:

|  | grams |
| --- | --- |
| Coating composition I | 126.0 |
| Citric acid solution (50% solids in methanol) | 2.0 |
| Total | 128.0 |

Coating composition IV is prepared by blending together the following constituents:

|  | grams |
| --- | --- |
| Coating composition I | 126.0 |
| Citric Acid solution (described above) | 2.0 |
| Diethanolamine | 1.5 |
| Total | 129.5 |

The yield stress, low shear viscosity and high shear viscosity is measured on each of the above prepared coating compositions I–IV at 25° C. The results are as follows:

| Coating Composition | | Yield Stress (Dynes) | |
| --- | --- | --- | --- |
| | | 25° C. | 80° C. |
| I | (silica) | 0 | 0 |
| II | (silica and amine) | 0 | 10 |
| III | (silica and acid) | 0 | 7 |
| IV | (silica acid and amine) | 421 | 138 |

| Coating Composition | Low Shear Viscosity (poises) | |
| --- | --- | --- |
| | 25° C. | 80° C. |
| I | 40 | 1 |
| II | 100 | 100 |
| III | 60 | 80 |
| IV | 2000 | 600 |

| Coating Composition | High Shear Viscosity (poises) | |
| --- | --- | --- |
| | 25° C. | 80° C. |
| I | 40 | 1 |
| II | 40 | 2 |
| III | 40 | 2 |
| IV | 40 | 10 |

The yield stress measures the inertia that must be overcome to cause the coating composition to flow.

It is desirable to have a high yield stress for a coating composition to reduce and preferably eliminate sagging of a finish after application.

Low shear viscosity measures the resistance to flow of a coating composition once it has been applied. A high viscosity at low shear rate is desirable to retard or stop the flow of a finish after application.

High shear viscosity measures the sprayability of a coating composition. It is preferred to have low viscosity at high shear rate so that the composition is readily sprayable.

Composition IV is the only composition that has a pseudoplastic rheology for high solids coating compositions and Composition IV in comparison to Compositions I–III has the desired combination of properties, i.e., a high yield stress, a high low shear viscosity and a low high shear viscosity.

The above compositions were prepared to illustrate the rheology control of the novel additive of this invention, i.e., the combination of silica/amine/acid.

EXAMPLE 2

A white mill base is prepared as follows:

|  | grams |
| --- | --- |
| Polyester A solution (prepared in Example 1) | 135.18 |
| Polyester B (prepared in Example 1) | 65.52 |
| Dispersant, (48% solids, in a solvent mixture of toluene/methyl ethyl ketone/methyl-isobutyl ketone of an isocyanate-modified methyl methacrylate/2-ethylhexyl acrylate/63/37 polymer, capped with mercaptosuccinic acid; described in Canadian Patent 968,092, Example I) | 18.30 |
| Amyl acetate | 58.18 |
| Titanium dioxide pigment | 586.03 |
| Total | 863.21 |

The above constituents are blended together and charged into a conventional sand mill and ground to a fineness of less than 0.5 mils.

A silica dispersion is prepared as follows:

|  | grams |
| --- | --- |
| Polyester solution A (prepared in Example 1) | 44.16 |
| Polyester B (prepared in Example 1) | 23.78 |
| Butyl acetate | 19.04 |
| Hexamethoxymethyl melamine | 72.35 |
| "Cab-O-Sil" M-5 silica (described in Example 1) | 8.00 |
| Total | 167.33 |

The above constituents are blended together and changed into a high speed mixer to form a dispersion.

A paint is prepared by blending together the following constituents:

|  | grams |
| --- | --- |
| White mill base (prepared above) | 863.21 |
| Hexamethoxymethylmelamine | 87.60 |
| Polymer solution A (prepared in Example 1) | 49.22 |
| Silica dispersion (prepared above) | 167.32 |
| Dinonyl naphthalene disulfonic acid solution (40% solution in butanol) | 9.99 |
| Dimethylethanolamine | 1.38 |
| Epoxy Ester Solution (40% solids in aromatic solvents of a dehydrated castor oil modified epoxy | 82.96 |

-continued

| | grams |
|---|---|
| resin having a Gardner-Holdt viscosity at 25° C. of about X-Z wherein the epoxy resin is the reaction product of epichlorohydrin and Bisphenol A) | |
| Acrylic polymer solution (60% solids of polymer of butyl acrylate/styrene/hydroxyethyl acrylate/acrylic acid/38/50/8/4, solvent composition: ethylene glycol monoethyl ether acetate/n-butanol/ aliphatic hydrocarbon/61/8/31 | 53.32 |
| Total | 1315.00 |

The resulting paint has an 86% by weight solids content and 74% by volume solids content and has a pigment to binder weight ratio of about 110/100. Binder refers to the film forming constituents in the paint. Based on the weight of the binder, the paint contains 1.5% by weight of silica, 0.25% by weight amine and 0.75% dinonyl naphthalene disulfonic acid.

The paint is electrostatically sprayed onto a steel panel and baked in a vertical position at 175° C. for 30 minutes to provide a 1.5 mil thick finish. The resulting paint finish was smooth even and glossy and no sagging of the paint was noted.

The same paint is prepared as above except the silica dispersion is omitted. The paint is electrostatically sprayed onto a steel panel and baked under the above identical conditions to provide a 1.5 mil thick finish. The resulting paint finish was not smooth, not even, sagged badly and had a poor appearance.

The same paint is prepared as above except the dinonyl naphthalene disulfonic acid is omitted. The paint is electrostatically sprayed on to a steel panel and baked under the above identical conditions to provide a 1.5 mil thick finish but the resulting finish sagged badly and had a poor appearance.

The same paint is prepared as above except the dimethyl ethanolamine is omitted. The paint after electrostatic spraying onto a primed steel substrate as above gave a 1.5 mil thick finish that sagged and had a poor appearance.

EXAMPLE 3

Additive Preparation
The additive is prepared as follows:

| | grams |
|---|---|
| Portion 1 | |
| Acrylic polymer solution (83% solids in methyl ethyl ketone of an acrylic polymer of methyl methacrylate/n-butyl acrylate/hydroxy ethyl acrylate 30/38/32 weight ratio and having a weight average molecular weight of 3,000) | 78.20 |
| Acrylic Polymer/silica Dispersion (80% solids in methyl ethyl ketone of the above acrylic polymer and 6% by weight based on the weight of the polymer of silica, described in Example 1) | 120.00 |
| Syrupy Phosphoric Acid | 0.70 |
| Portion 2 | |
| Diethanolamine | 1.85 |

-continued

Additive Preparation
The additive is prepared as follows:

| | grams |
|---|---|
| Total | 200.75 |

The ingredients of portion 1 are blended together and then portion 2 is added and stirred for 15 minutes.

A paint is prepared by blending the following constituents:

| | grams |
|---|---|
| Additive (prepared above) | 60.0 |
| Acrylic Polymer/silica Dispersion (described above) | 69.90 |
| Acrylic Polymer Solution (described above) | 135.42 |
| Green Mill Base prepared by sand grinding the following mixture: 54.97% hexamethoxymethylol melamine, 28.97% titanium dioxide pigment, 7.09% Ferrite Yellow Orange (iron-oxide) pigment, 0.42% "Monastral" Green pigment, 0.35% carbon black pigment, 8.2% solvent mixture ethylene glycol monobutyl ether acetate/ethylene glycol monoethyl ether acetate/methanol). | 159.83 |
| BYK-300 Silicone solution (10% silicone resin of a low molecular weight in ethylene glycol monoethyl ether acetate) | 2.93 |
| N-Butyl amine | 0.45 |
| Paratoluene sulfonic acid solution (10% solution in ethylene glycol mono-ethyl ether acetate) | 11.71 |
| Thinner - ethylene glycol | 26.60 |
| Total | 466.84 |

The paint is sprayed onto a steel panel primed with a black-dip alkyd resin primer. The panel is allowed to flash dry for 10 minutes at room temperature and then is baked for 10 minutes at 72° C. and then baked for 30 minutes at 120° C. The resulting paint finish is smooth and even and does not sag and has the following physical properties:

| Gloss measured at 20° | 82.6 |
|---|---|
| Distinctness of Image (Scale 0-10 where 10 is perfect) | 8 |
| Hardness | 12.8 Knoops |
| Film Thickness | 2.0-2.2 mils |
| Appearance | Trace orange peel |
| Overall appearance | Excellent |

EXAMPLE 4

A paint is prepared by blending the following constituents:

| | grams |
|---|---|
| Additive (prepared in Example 3) | 149.38 |
| Acrylic Polymer Solution (described in Example 3) | 90.74 |
| Acrylic Polymer/Silica Dispersion | 9.94 |

-continued

|  | grams |
|---|---|
| Green Mill Base (Described in Example 3) | 150.00 |
| BYK-300 Silicone Solution (described in Example 3) | 2.75 |
| n-Butylamine | 0.42 |
| Paratoluene sulfonic acid solution (Described in Example 3) | 10.99 |
| Thinner (Described in Example 3) | 27.20 |
| Total | 441.42 |

The paint is sprayed onto a steel panel primed as in Example 3 and baked according to the procedure of Example 3. The resulting paint finish has the following physical properties:

| Gloss measured at 20° | 85 |
|---|---|
| Distinctness of Image | 8 |
| Film thickness | 1.8–2.2 mils |
| Appearance - No sagging or popping, Trace orange peel | |
| Overall appearance - Excellent | |

We claim:
1. An additive comprising about:
   (a) 40–98% by weight based on the weight of the additive, of finely divided silica;
   (b) 1–40% by weight, based on the weight of the additive, of a polyfunctional acid constituent selected from the group consisting of a polyfunctional carboxylic acid, an anhydride or a polyfunctional carboxylic acid, phosphoric acid or polysulfonic acid, and
   (c) 1–15% by weight, based on the weight of the additive, of an amine;
wherein the total of (a), (b) and (c) equals 100%.
2. The additive of claim 1 which consists essentially of about
   (a) 50–90% by weight, based on the weight of the additive, of finely divided silica,
   (b) 5–35% by weight, based on the weight of the additive, of a polyfunctional acid constituent selected from the group consisting of a polyfunctional carboxylic acid, an anhydride of a polyfunctional carboxylic acid, phosphoric acid or polysulfonic acid and
   (c) 5–15% by weight, based on the weight of the additive, of an amine.
3. The additive of claim 2 in which the silica is fumed silica having a particle size of about 0.002 to 1.0 micrometers and a surface area of 2.5 to 1,200 square meters per gram.
4. The additive of claim 2 in which the acid is selected from the group consisting of citric acid, dinonyl naphthalene disulfonic acid, maleic acid, maleic anhydride and phosphoric acid.
5. The additive of claim 2 in which the amine is an alkyl alkanol amine.
6. The additive of claim 3 in which the amine is diethanolamine, triethanolamine, dimethylethanolamine diethylethanolamine, diethylenetriamine or triethylene tetraamine.
7. The additive of claim 3 in which the silica is fumed silica, the acid is citric acid and the amine is diethanolamine.
8. The additive of claim 3 in which the silica is fumed silica, the acid is dinonyl napthalene disulfonic acid and the amine is dimethylethanol amine.
9. The additive of claim 3 in which the silica is fumed silica, the acid is phosphoric acid and the amine is diethanolamine.
10. The additive of claim 3 in which the silica is fumed silica, the anhydride is maleic anhydride and the amine is diethanolamine.
11. The additive of claim 3 in which the silica is fumed silica, the anhydride is succinic anhydride and the amine is diethanolamine.
12. The additive of claim 1 which contains an alkylene oxide.
13. The additive of claim 3 in which the silica is a fumed silica, the acid anhydride is maleic anhydride, the amine is diethanolamine and the additive contains an alkylene oxide.
14. A coating composition containing about 1–15% by weight, based on the weight of the coating composition, of the additive of claim 1.

* * * * *